United States Patent [19]

Letica

[11] Patent Number: 4,676,732
[45] Date of Patent: Jun. 30, 1987

[54] MOLDING APPARATUS

[75] Inventor: Ilija Letica, Rochester, Mich.

[73] Assignee: Letica Corporation, Rochester, Mich.

[21] Appl. No.: 780,588

[22] Filed: Sep. 26, 1985

[51] Int. Cl.⁴ .................. B29C 45/26; B29C 33/00
[52] U.S. Cl. ........................... 425/577; 249/63;
249/144; 249/169; 249/178; 249/180; 249/184;
425/417; 425/DIG. 5; 425/DIG. 58
[58] Field of Search .......... 249/58, 59, 63, 144,
249/160, 175, 176, 177, 178, 180, 184;
425/DIG. 5, 393, 403, 457, 417, 556, 577, DIG. 58

[56] References Cited

U.S. PATENT DOCUMENTS

| 4,286,766 | 9/1981 | Von Holdt | 249/178 |
| 4,362,291 | 12/1982 | Fuke et al. | 425/403 |
| 4,378,928 | 4/1983 | Kopp et al. | 249/63 |
| 4,383,819 | 5/1983 | Letica | 425/393 |
| 4,533,312 | 8/1985 | Von Holdt | 425/DIG. 5 |

Primary Examiner—Willard E. Hoag
Attorney, Agent, or Firm—Krass & Young

[57] ABSTRACT

A bucket-shaped container having a rim opening smaller than the diameter of the side wall thereof is injected molded from thermoplastic material using a die set including a molding core which collapses to allow axial removal of the molded container from the mold. The molding core comprises a plurality of individual, wedge-shaped outer core sections which collectively form a continuous molding surface and are slideably mounted on a tapered inner core to allow axial sliding movement of the outer core section relative to the inner core. The sliding movement of the outer core sections on the inner core is provided by a plurality of keylocks which are fixedly secured in corresponding axial keyways in the inner core and which slideably engage corresponding axial keyways in the outer core sections. Coacting cam faces on the keylock and on the keyway of the outer core sections ensure that the outer core sections move firmly and positively into engagement with the inner core as the outer core sections arrive at their expanded molding positions. Means are also disclosed to ensure that the keylock is firmly and positively seated in the keyway in the inner core and further camming means are disclosed to ensure that the lower ends of the outer core sections are held firmly against the inner core during the molding operation.

5 Claims, 11 Drawing Figures

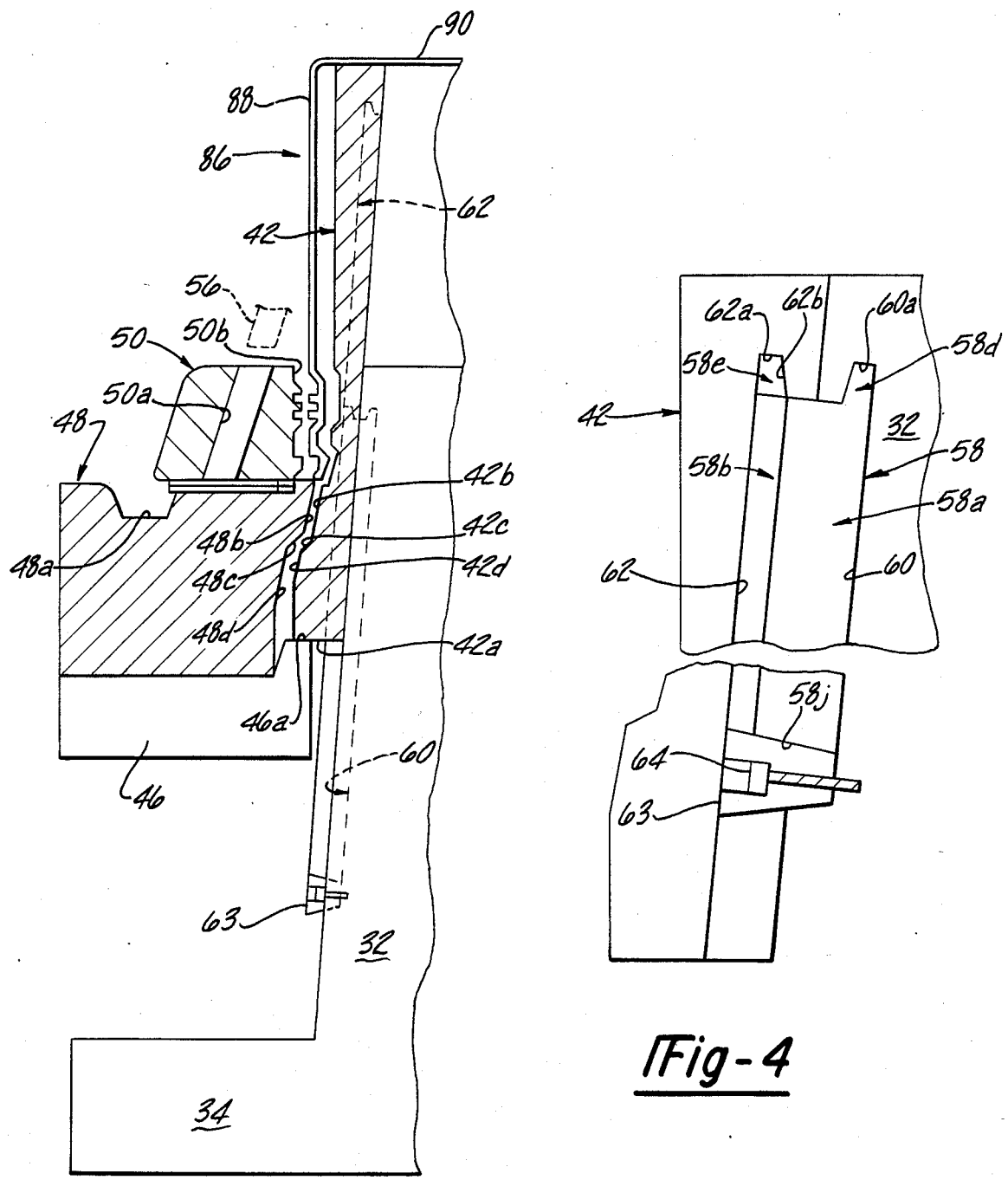

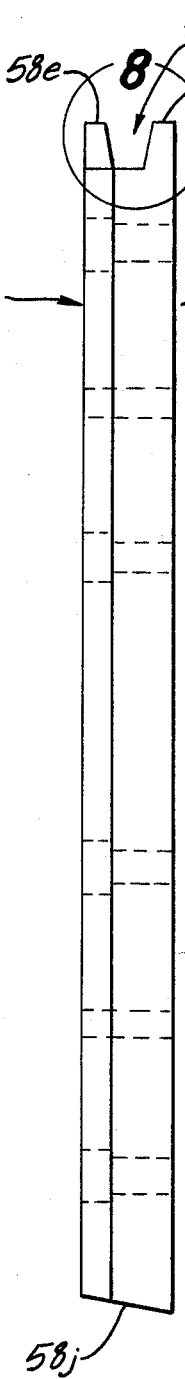
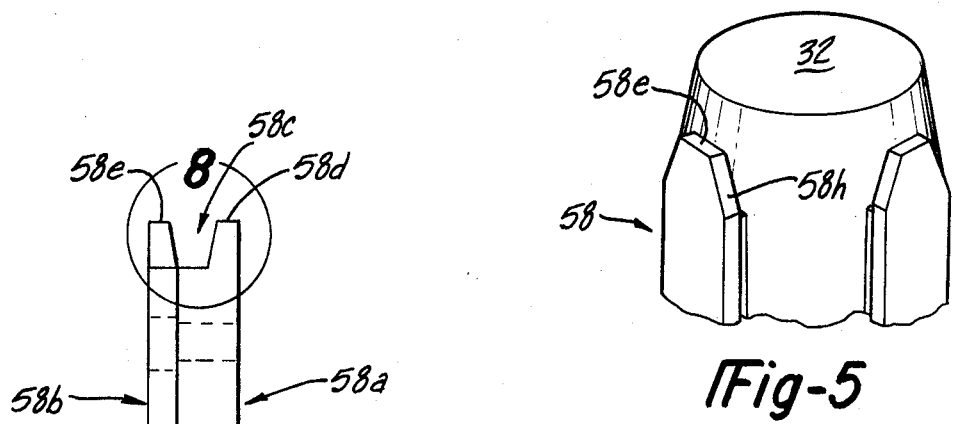
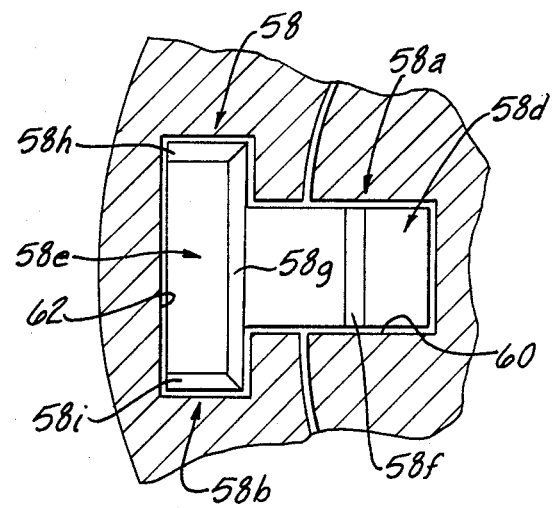
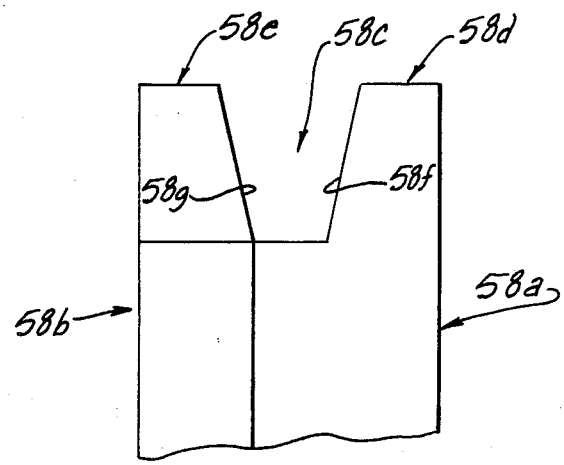

MOLDING APPARATUS

BACKGROUND OF THE INVENTION

This invention relates to a molding apparatus of the type having movable mold sections and deals more particularly with a mold and related molding process in which a collapsible core is employed to form a cavity in a molded article wherein interior dimensions of the cavity exceed that of the opening in the article into which the molding core extends.

Containers such as buckets and pails of unitary construction molded from plastic materials are becoming more widespread in use due, in part, to the fact that they may be economically produced in large quantities. Molded plastic containers have replaced many types of previous metal constructions. However, the use of containers for certain products, such as those which are toxic or flammable, require that the container be exceptionally rigid and not subject to rupture or deformation under ordinary use. In connection with this latter requirement, molded plastic containers have not been entirely successful in replacing metal constructions for reasons which will be discussed below. In designing a molded plastic container which is safe for use with paints, thinners and the like, it is absolutely necessary that the lid of the container remain securely fastened to prevent leakage even when the container is roughly handled as during shipping. Although inner locks between the container lid and the rim of the container have been designed to form a liquid-tight seal under ordinary conditions, such seal may be broken and the lid may be inadvertently removed from the container if the rim exhibits flexion.

In order to prevent flexing of the container rim, circumferential reinforcement ribs have been molded integral with the rim in order to increase the hoop strength of the rim. Since it is also a requirement of this type of container that the side walls thereof be free from projections, it is necessary to recess the circumferential reinforcement ribs in the side walls of the container; this in turn requires that the rim be of reduced inside diameter compared to the inside diameter of the side walls of the container.

Because of the reduced rim diameter, it has been necessary in the past to produce the containers using a two-step blow and injection molding process which involves melting a thermoplastic resin; forming a tube from the melted resin using injection molding techniques; and inflating the tube within a blow mold to form the container. This process is undesirable, however, since the tube production steps not only require at least two molds but are also time consuming compared to a one-step process.

Other types of molding processes, such as injection molding, have not been successfully employed in the past to mold containers of the type mentioned because collapsible molding cores of the type necessary for forming the interior side walls of the container have not heretofor been available. The prior art collapsible cores, such as those disclosed in U.S. Pat. Nos. 3,247,548 and 3,660,001, are suitable for forming cavities in relatively shallow articles such as threaded container caps but are not capable of forming deep cavities such as the interior of a bucket. Collapsible cores of the type disclosed in these patents are formed from a plurality of circularly disposed, resilient molding segments circumferentially surrounding an inner core and rigidly connected to each other at one end thereof. Upon removal of the inner core, the natural resilience of the molding segments causes one end of the segments to spring radially inward, thereby collapsing the outer extremities of the segments to release the molded article. Since only the outer extremities of the molding segments collapse a substantial distance, these collapsible cores may not be practically employed for molding deeper cavitites such as the interior of the container itself.

From the foregoing it is apparent that there is a clear need in the art for a container of the type described above which comprises high density plastic material. It is therefore an important object of the present invention to provide a container of bucket-like configuration having a reinforced rim provided with an interior diameter less in magnitude than the interior diameter of the side walls of the container but yet which is exceptionally rigid and durable.

Another important object of the invention is to provide a one-step process for molding a container of the type mentioned above.

Another object of the invention is to provide die apparatus suitable for injection molding plastic material to form the described container.

SUMMARY OF THE INVENTION

The invention is directed to an injection molding apparatus of the type including a base, a central inner core carried on the base and including a circumferential outer surface centered on a central axis, a plurality of outer core elements disposed circumferentially around the outer surface of the central inner core, and means mounting the outer core elements for simultaneous axial and radial movement relative to the inner core to provide an expanded, molding configuration for the core assembly and a collapsed, removal configuration to facilitate removal of the molded article. The present invention relates to improved means for mounting the outer core elements for simultaneous axial and radial movement relative to the inner core.

According to one feature of the invention, these mounting means comprise an axially extending keyway formed along the radially inner surface of the outer core elements and including a cam surface extending obliquely with respect to the circumferential outer surface of the central core, and a plurality of axially extending keys provided at circumferentially spaced locations on the circumferential outer surface of the central core for respective coaction with the keyways in the outer core elements and each including a cam surface extending obliquely with respect to the circumferential outer surface of the central core and operative in response to relative axial movement between the outer core elements and the central core to cammingly and wedgingly force the radially inner surface of the respective outer core elements against the circumferential outer surface of the central core. This arrangement ensures that the outer core segments, in their expanded, molding configuration, will be maintained in snug sealing relationship to the central core to avoid the formation of flash at the interface between the outer mold segments and the central core.

According to a further feature of the invention, the keys on the central core extend axially along the circumferential outer surface of the central core away from the base to an axially outer end spaced axially from the axially outer end of the central core; each of the keyways in the outer core elements extend axially along the radially inner surface of the core element to a blind end spaced axially from the axially outer end of the segment; and the coacting cam surfaces are provided in the blind ends of the keyways and on the axial outer ends of the keys respectively. This arrangement avoids the intrusion of the keys and keyways into the actual molding surface so as to preclude the formation of trace marks relating to such intrusion and further provides an effective means of forcing the outer core elements tightly against the central inner core.

According to a further feature of the invention, further coating cam surfaces are provided in the blind ends of the keyways and on the axially outer ends of the keys and such further cam surfaces coact upon the arrival of the axially outer key ends in the blind ends of the keyways to wedgingly and positively locate each outer core element angularly about the central axis of the central core.

According to a further feature of the invention, each of the outer core elements further includes an arcuate cam surface adjacent the axially inner end thereof, and the molding apparatus further includes a stripper ring mounted in surrounding relation to the central core and having annular cam surfaces on its internal periphery for camming and wedging coaction with the arcuate cam surfaces on the outer core elements to further ensure that the outer core elements are maintained in firm, tight seating relationship to the central core during the molding process.

According to a further feature of the invention, axially extending keyways are formed along the radially inner surface of the outer core elements and at circumferentially spaced locations around the radially outer surface of the central core, and the keys are provided by a plurality of elongated keylocks having elongated radially inner portions fixedly received in the central core keyways and elongated radially outer portions slideably received in the outer element keyways.

According to a further feature of the invention, each of the central core keyways extends axially along the outer surface of the central core to a blind end spaced axially from the axially outer end of the central core; coacting cam surfaces are provided in the blind end of the central core keyway and on the axially outer ends of the radially inner portions of the keylocks; and a plurality of wedges are secured to the central core adjacent the base and each wedge coacts with a cam surface on the axially inner end of a respective keylock to urge the keylock axially outwardly and securely wedge the axially outer end of the radially inner portion thereof into the blind end of the central core keyway.

BRIEF DESCRIPTION OF THE DRAWINGS

FIG. 3 is a fragmentary somewhat schematic view of the invention injection molding apparatus shown in a article release position;

FIG. 4 is a fragmentary view showing the keyway and keylock construction of the injection molding apparatus;

FIG. 5 is fragmentary perspective view showing details of the keyway and keylock structure;

FIG. 6 is a side view of a keylock;

FIG. 7 is a cross-sectional, somewhat schematic view of the keyway and keylock structure;

FIG. 8 is a detail view of the keylock structure within the circle 8 of FIG. 6;

DETAILED DESCRIPTION OF THE PREFERRED EMBODIMENT

Figure 1:
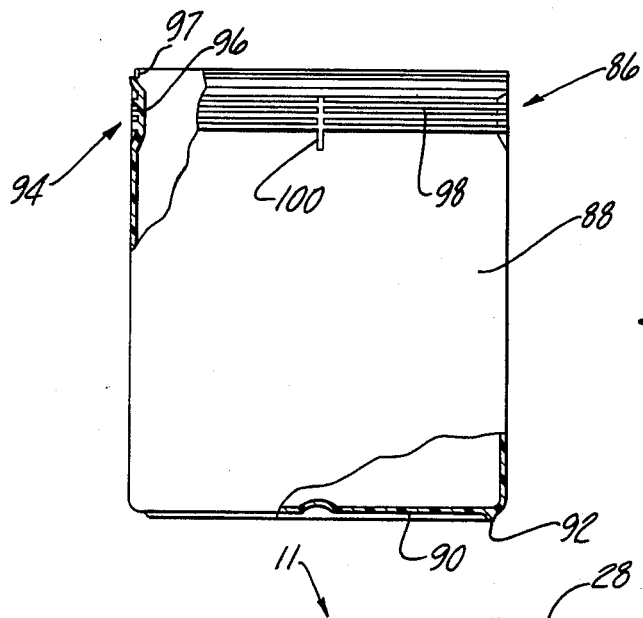
FIG. 1 is a view of a container formed by the injection molding apparatus of the present invention.

Referring first to FIG. 1, the present invention is concerned with a process and apparatus for molding a pail or bucket shaped container 86 from plastic material, preferably thermoplastic such as polyethylene. The pail 86 includes a cylindrically shaped side wall 88 extending upwardly from a circular base 90. A downwardly depending stacking flange 92 is formed integral with the bottom of the base 90 and is adapted to conformingly seat in an annular depression in a lid (not shown) of a similar container (not shown). The top of the contaner 86 is essentially open and is defined by a circular rim 94 which comprises interior side wall portions 96 having a diameter less in magnitude than the inside diameter of the side wall 88. The exterior of rim 94 is defined by a plurality of spaced circumferentially extending reinforcement ribs 98 which extend radially outward a distance no greater than the exterior surfaces of the side wall 88. Reinforcement ribs 98 provide the rim 94 with added hoop strength so as to maintain the rim 94 extremely rigid and therefore not subject to substantial flexing.

The rim 94 is also provided with a plurality of circumferentially spaced, longitudinally extending vertical reinforcement ribs 100 connecting the circumferential reinforcement ribs 98. Vertical reinforcement ribs 100 extend radially coextensive with ribs 98 and provide the rim with added compressive strength in the axial direction of container 86 so as to enable the container 86 to withstand force imposed on the rim when a lid (not shown) is forceably installed thereon. The rim 94 further includes a locking edge construction 97 which is adapted to lockingly interfit with a mating lid (not shown) to form a fluid tight seal between the lid and container 86.

The container 86 is formed by injection molding a thermoplastic material such as polyethylene using the invention molding apparatus. The thermoplastic material preferably possesses a density of 0.947 to 0.965 grams per cubic centimeter and the melt index of the material is preferably between 3 and 18 melt.

The invention molding apparatus, broadly considered, comprises a first mold portion 11 and a second mold portion 12.

First mold portion 11 includes a circularly shaped base 14 having a notch 20 in the periphery thereof adapted to be releasably mounted on a movable ram (not shown) of a conventional mold machine (not shown). An injection nozzle 28 is centrally disposed in the base 14 and is adapted to be connected with a source of fluent molding material in order to inject such material into the mold cavity. The first mold portion 11 further includes an annular side wall 16 depending downwardly from the base 14. Base 14 and side wall 16 form portions of a mold cavity which define the side wall 88 and base 90 of the molded container 86.

The second mold portion 12 broadly comprises a molding core including an inner central core portion 32, an outer collapsible core assembly 40, and a circular base 34. Base 34 is provided with a notch 36 in the periphery thereof in order to releasably mount the second mold portions on a stationary holding member of the injection molding apparatus. Central inner core portion 32 is of circular cross section and is defined by inclined exterior side walls extending upwardly from the base 34 so as to provide a core in the form of a truncated cone. Inner core portion 32 is preferably formed integrally with mold base 34.

Figure 10:
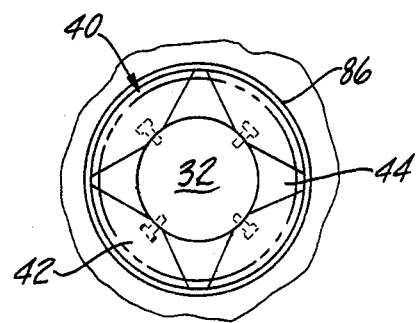
FIG. 10 is a fragmentary view showing the manner in which the outer core elements coact with the central core element to form the collapsible core assembly.
Figure 11:
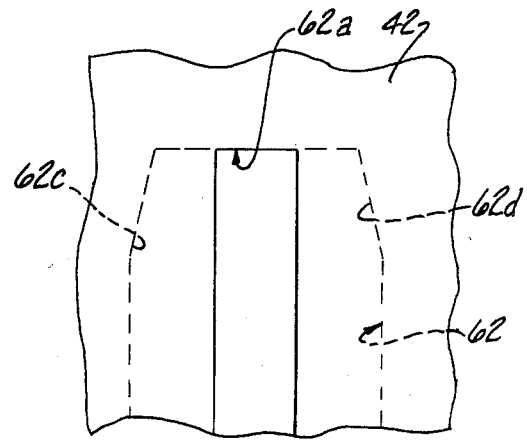
FIG. 11 is a fragmentary view of an outer core element.

The outer collapsible core assembly 40 is defined by first and second molding elements or sections 42 and 44, respectively, each mounted for axial travel on the inner core portion 32 as the mold is moved between its closed molding position and its open released position. Each of the core sectons 42 and 44 is of wedge shape, both in transverse and longitudinal cross section, as best seen in FIG. 10. Core sections 42 include substantially curved outer surface areas which form a molding face of the mold cavity and which are adapted to mold portions of the interior surface areas of the side walls 88 of the container 86. Core sections 44 likewise present a molding face but of lesser surface area than that of core sections 42.

Figure 2:
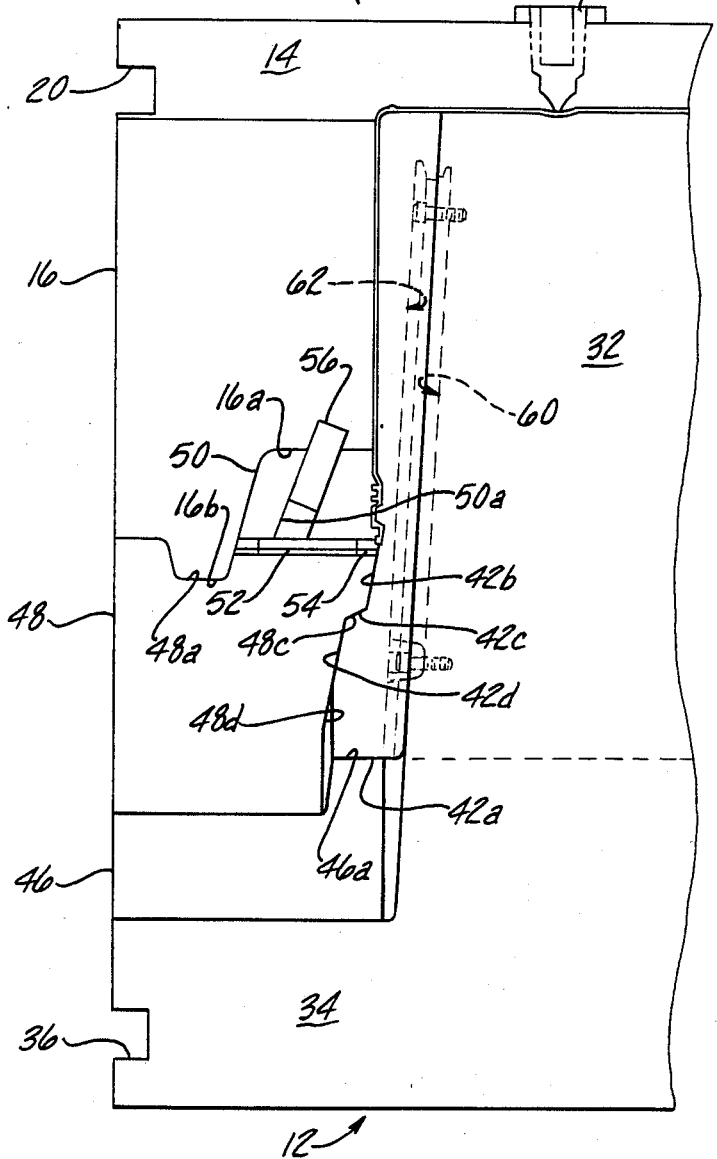
FIG. 2 is a fragmentary somewhat schematic view of the invention injection molding apparatus shown in a closed, molding position.
Figure 9:
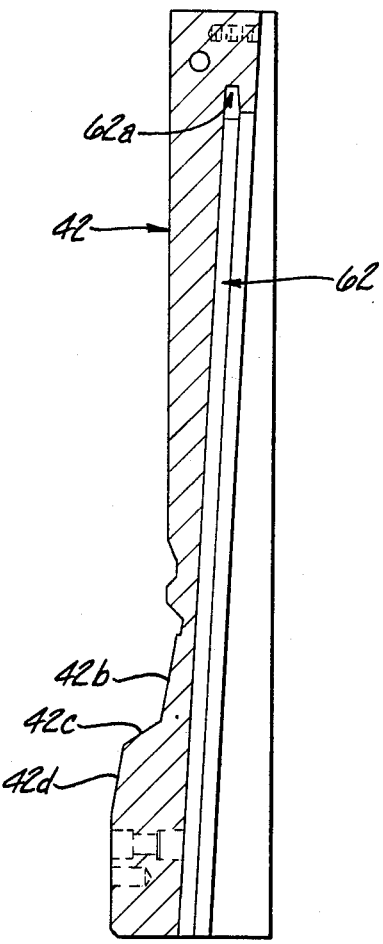
FIG. 9 is a cross-sectional view of an outer core element of the molding apparatus.

When the outer collapsible core assembly 40 is expanded to a molding position, as seen in FIGS. 2, 4 and 10, the exterior molding faces of core sections 42 and 44 form a continous cylindrically shaped molding core for forming the interior surface areas of side wall 88 of the container 86. Core segments 42 and 44 are alternately circumferentially disposed about inner core portion 32 to form the total composite core assembly.

The molding apparatus further includes an annular ejector plate 46 surrounding the lower or axially inner end of central core 32 and seated, in the molding position of the apparatus, on base 34; an annular stripper ring 48 seated on ejector plate 46 in surrounding relation to central core 32 and fixedly secured to the ejector plate; and a plurality of circumferentially spaced outer mold segments or collets 50 positioned on the upper or axially outer face of stripper ring 48 and each having a T-shaped key 52 mounted for sliding movement in a T-shaped keyway 54 in the upper face of stripper ring 48 to allow radial sliding movement of the collets 50 relative to stripper ring 48. In the molding position of the apparatus, as seen in FIG. 2, collets 50 are received in recesses 16a defined at the lower or axially inner end of a side wall 16 and an annular rib 16b formed along the lower face of side wall 16 fits in an annular groove 48a provided in the upper face of stripper ring 48. A plurality of circumferentially spaced angled actuator pins 56 are secured to the lower or axially inner end of side wall 16 and project respectively into angled bores 50a in collets 50.

Core segments 42 are mounted for axial sliding movement on central core 32 between their expanded molding positions and their contracted release positions by a keyway and keylock structure. One keyway and keylock structure is provided for each core segment 42 so that if, as seen in FIG. 10, there are four segments 42, four keyway and keylock structures are provided. Each keyway and keylock structures includes an elongated axially extending keylock 58 fixedly received in an axially extending keyway 60 in central core 32 and slideably received in an axially extending keyway 62 in a respective core segment 42.

Each keylock 58 is generally T-shaped, as best seen in FIG. 7, and includes a radially inner portion 58a for coaction with a keyway 60 in central core 32 and a radially outer portion 58b for coaction with a keyway 62 in a respective segment 42.

As best seen in FIG. 8, the upper or axially outer end of each keylock is notched as seen in 58c to provide a radially inner finger portion 58d and a radially outer finger portion 58e, and a radially outer face 58f of finger 58d is obliquely disposed with respect to the primary lengthwise axis of the keylock to provide a wedging face. The radially inner face 58g of radially outer finger portion 58e is obliquely disposed in an opposite sense with respect to the lengthwise axis of the keyway to provide a wedging surface for finger portion 58e and the opposite circumferential ends 58h and 58i of finger portion 58e are also obliquely disposed to provide wedging faces. Wedge faces 58f,g,h and i preferably have an angle of approximately 10° with respect to the lengthwise axis of the keylock.

Keyway 60 extends axially along central core 32 from a location adjacent the base of the core to a blind end 60a spaced axially from the axially outer end of the central core. Blind end 60a of keyway 60 has a wedge configuration substantially corresponding to the configuration of radially inner finger portion 58d on keylock 58.

Keylocks 58 are installed in keyways 60 by the use of wedge blocks 63. Specifically, as best seen in FIG. 4, a keylock 58 is placed within a keyway 60 and pushed manually upwardly or axially outwardly to insert finger portion 58d into blind end 60a, whereafter a wedge 63 is positioned against a cam face 58j at the lower or axially inner end of the keylock and the wedge is moved radially inwardly by the use of a screw 64 engaging a suitable tapped bore in central core 32. As the wedge 63 is moved radially inwardly by the threading action of screw 64, the wedge coacts with the cam surface 58j on the lower end of the keylock to force the keylock upwardly or axially outwardly and firmly seat finger portion 58d in blind end 60a of keyway 60.

Each keyway 62 has a T-configuration similar to the T-configuration of the radially outer portion 58b of the keylock and each keyway 62 includes a blind end 62a, spaced axially from the axially outer end of the associated core segment 42, having a configuration generally conforming to the configuration of finger portion 58e of the keylock. Each core segment 42 is slideably received on a radially outer portion 58b of a keylock and as the core segment moves downwardly or axially inwardly into its molding position, the finger 58e of the keylock move firmly and wedgingly into the blind end 62a of the keyway. As the oblique surface 58g on the finger 58e coacts with the corresponding oblique wedge face 62b in the blind end of the keyway, the segment 42 is pulled firmly and tightly inwardly into firm seating engagment with the confronting surface of central core 32. Further, as the oblique faces 58h and 58i of the finger 58e move into camming engagement with the corresponding oblique surfaces 62c and 62d provided in the blind end 62a, the segment 42 is positioned in a positive annular orientation with respect to central core 32 so as to provide a positive angular orientation of the segments 42 circumferentially about the central core 32.

It will be appreciated that movement of the core segments axially along the key locks is accomplished by movement of ejector plate 46 relative to base 34. Specifically, following a molding operation, the upper or axially outer mold portion 11 is suitably removed from the core assembly by the use of a ram of the conventional injection mold machine. As side wall 16 moves axially outwardly, actuator pins 56 cammingly coact with angled bores 50a in collects 50 to move the collets radially outwardly along the keyways 54 in stripper ring 48 and thereby move the molding surfaces 50b on the collects radially outwardly from the rim of the molded container 86. Ejector plate 46 is now moved upwardly from base 34 carrying stripper ring 48 with it. Movement of ejector plate upwardly or axially outwardly away from base 34 also moves segments 42 axially outwardly along keylocks 58 by virtue of the engagement of the surface 46a of the ejector plate with the lower or axially inner end surface 42a of the core segments 42. As the ejector plate moves upwardly with segments 42, segments 42 move radially inwardly relative to the ejector plate by virtue of the inclined disposition of the keylocks 58 so that segments 42 slide radially inwardly along the surface 46a of the ejector plate. Suitable guide mechanisms may be provided at this interface if desired. Movement of the core segments 42 upwardly or axially outwardly to the position of FIG. 3 moves the segments radially inwardly away from the adjacent surfaces of the molded container. Following removal of the molded container, ejector plate 46 is again moved downwardly or axially inwardly to the position of FIG. 2 in which it seats against base 34 of the core assembly. As the ejector plate moves to its molding position of FIG. 2, segments 42 slide downwardly along the keylocks to their molding position and cam faces 42b, c and d on the radially outer surface of the segments 42 move back into seating engagement with complimentary surfaces 48b, c and d on the stripper ring so that the lower or axially inner ends of the segments 42 are pressed firmly radially inwardly and axially inwardly against the central core segment 32 to provide a positive positioning of the lower end of the segments 42 against the central core 32. The core segments 42 are thus firmly held in positive seating engagement against the central core 32 at their upper or axially outer ends by the wedging coaction of keyway finger portions 58e with keyway blind ends 62a and at their lower or axially inner ends by the wedging engagement of the surfaces 48b, 48c and 48d of the stripper ring with the corresponding cam surfaces 42b, 42c and 42d on the core segments.

It will be seen that the invention molding apparatus provides a simple and effective means of ensuring that the outer mold segments are moved into and maintained in tight seating engagement against the confronting surfaces of the central core member so as to minimize the possibility of flash being formed on the container at the interface between the outer core segments and the central core member. The invention apparatus will also be seen to provide positive circumferential orientation as between the various outer core segments as to minimize the possibility of flash forming at the interfaces between the core segments. The invention mold assembly also allows for substantially longer mold apparatus life since it minimizes the propensity of the apparatus to develop looseness or slop over extended periods of usage. The invention mold apparatus will thus be seen to provide both a higher quality molded product and a longer mold apparatus life.

Although a preferred embodiment of the invention has been illustrated and described in detail, it will be apparent that various changes may be made in the disclosed embodiment without departing from the spirit or scope of the invention.

I claim:

1. In an apparatus for injection molding an article and including a base, a central inner core on the base and including a circumferential outer surface centered on a central axis and a free axially outer end remote from the base, a plurality of outer core elements disposed circumferentially around the outer surface of the central core member and each having an axially outer end remote from the base, and means mounting the outer core elements for simultaneous axial and radial movement relative to the inner core to provide an expanded molded configuration for the core assembly and a collapsed, removal configuration to facilitate removal of the molded article, the improvement wherein said mounting means comprises:

(A) a keyway extending axially along the radially inner surface of at least certain of said outer core elements to a blind end space axially from the axially outer end of the respective core element and including a cam surface in the blind end thereof extending obliquely with respect to the circumferential outer surface of said central core member;

(B) a plurality of circumferentially spaced keyways each extending axially along the radially outer surface of said central core member to a blind end spaced axially from the axially outer end of said central core member and each including a cam surface in the blind end thereof extending obliquely with respect to the circumferential outer surface of said central core member; and (C) a plurality of axially extending keys provided at circumferentially spaced locations on the circumferential outer surface of said central core for respective coaction with said keyways and each including a notch at its axially outer end defining a radially outer wedging finger portion and a radially inner wedging finger portion, said radially outer wedging finger portion including a cam surface extending obliquely with respect to said circumferential outer core member surface and operatively coacting with said cam surface in the blind end of a keyway in a respective outer core element upon relative axial movement between said certain outer core elements and said central core member to cammingly and wedgingly force the radially inner surface of the respective outer element against the circumferential outer surface of said central core member, said radially inner wedging finger portion including a cam surface extending obliquely with respect to said circumferential outer core member surface and operatively coacting with said cam surface in the blind end of a respective keyway in said central core member upon relative axial movement between said keys and said core member to firmly seat said radially inner wedging finger portion in the blind end of the respective keyway in said central core member.

2. An injection molding apparatus according to claim 1, wherein:

(D) further coacting cam surfaces are provided in said blind ends of said outer core element keyways and on said radially outer wedging finger portions of said keys and such further cam surfaces coact upon arrival of said radially outer wedging finger portions in said blind ends of said outer core element keyways to wedgingly and positively locate each outer core element angularly about said axis.

3. An injection molding apparatus according to claim 1 wherein:

D. each of said certain outer core elements further includes a molding surface on its radially outer surface extending from said axially outer end thereof to a location spaced from the axially inner end thereof and an arcuate cam surface adjacent the axially inner end thereof; and E. said apparatus further includes
1. an annular ejector plate surrounding said central core,
2. a stripper ring mounted on said ejector plate and having annular cam surfaces on its internal periphery for camming and wedging coaction with said arcuate cam surface on said outer core elements,
3. a plurality of outer mold segments positioned circumferentially around said outer core elements and each including a molding surface, and
4. means mounting said outer mold segments for radial movement on said stripper ring between a radially inner molding position in which the molding surface thereon coacts with the molding surface on an outer core element to define a portion of the article to be molded and a radially outer release position to facilitate removal of the article from the apparatus.

4. In an apparatus for injection molding an article and including a base, a central inner core on the base and including a circumferential outer surface centered on a central axis and a free axially outer end remote from the base, a plurality of outer core elements disposed circumferentially around the outer surface of the central inner core and means mounting the outer core elements for simultaneous axial and radial movement relative to the inner core to provide an expanded molding configuration for the core assembly and a collapsed removal configuration to facilitate removal of the molded article, the improvement wherein said mounting means comprises:

(A) a plurality of axially extending keyways formed along the radially inner surface of said outer core elements;

(B) a plurality of axially extending keyways formed at circumferentially spaced locations about the radially outer surface of said central core and each extending along the outer surface of the central core to a blind end spaced axially from the axially outer end of the central core;

(C) a plurality of elongated keylocks having elongated radially inner portions slideably received in said central core keyways and elongated radially outer portions slideably received in said outer elements keyways;

(D) coacting cam surfaces in the blind ends of said central core keyways and on the axially outer ends of said radially inner portions of said keylocks; and (E) a plurality of wedges secured to said central core adjacent said base with each wedge coacting with a cam surface on the axially inner end of a respective keylock to slideably urge the keylock axially outwardly and securely wedge the axially outer end of the radially inner portion thereof into the blind end of the respective central core keyway.

5. An injection molding apparatus according to claim 4 wherein:

F. each of said outer core element keyways extends axially along the radially inner surface of the element to a blind end-spaced axially from the axially outer end of the element;

G. further coacting cam surfaces are provided in the blind ends of said outer element keyways and on the axially outer ends of said radially outer portions of said keylocks; and H. said further coacting cam surfaces are operative in response to axial movement of the axially outer ends of said keylocks into the blind ends of said outer elements keyways to cammingly and wedgingly force the inner surface of the respective outer element against the inner surface of said central core element.

* * * * *